United States Patent
Vaughan et al.

(10) Patent No.: US 6,441,861 B2
(45) Date of Patent: Aug. 27, 2002

(54) COMPUTER CONVERGENCE DEVICE CONTROLLER FOR MANAGING DISPARATE VIDEO SOURCES

(75) Inventors: Mark P. Vaughan, Spring; Thomas J. Brase; Drew S. Johnson, both of Houston; William H. Ellis, The Woodlands, all of TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/850,220

(22) Filed: May 7, 2001

Related U.S. Application Data

(62) Division of application No. 08/834,543, filed on Mar. 31, 1997, now Pat. No. 6,229,575.

(51) Int. Cl.⁷ .............................................. H04N 5/445
(52) U.S. Cl. .................................... 348/564; 348/706
(58) Field of Search ................................ 348/552, 565, 348/563, 566, 564, 468, 705, 706; H04N 5/268, 5/44, 5/445, 5/45

(56) References Cited

U.S. PATENT DOCUMENTS

| | | |
|---|---|---|
| 4,488,179 A | 12/1984 | Kruger et al. |
| 4,628,541 A | 12/1986 | Beavers |
| 4,658,247 A | 4/1987 | Gharachorloo |
| 4,775,928 A | 10/1988 | Kendall et al. |
| 4,954,819 A | 9/1990 | Watkins |
| 5,291,275 A | 3/1994 | Lumelsky |
| 5,351,129 A | 9/1994 | Lai |
| 5,434,628 A * | 7/1995 | Spiero et al. |
| 5,451,981 A | 9/1995 | Drako et al. |
| 5,488,393 A | 1/1996 | Wood et al. |
| 5,502,462 A | 3/1996 | Mical et al. |
| 5,543,824 A | 8/1996 | Priem et al. |
| 5,572,698 A | 11/1996 | Yen et al. |
| 5,610,663 A | 3/1997 | Nan et al. |
| 5,671,019 A | 9/1997 | Isoe et al. |
| 6,055,023 A * | 4/2000 | Rumreich et al. .......... 348/553 |

OTHER PUBLICATIONS

*Gateway 2000 Sells Destination Big Screen PC Through Retail Chains*, Internet article, pp. 1–4 (Aug. 20, 2996).
*Gateway 2000 Launches Destination Big Screen PC Featuring 31–Inch Monitor*, Internet article, pp. 1–5 (Mar. 21, 1996).

(List continued on next page.)

Primary Examiner—David E. Harvey
(74) Attorney, Agent, or Firm—Akin, Gump, Strauss, Hauer & Feld, LLP

(57) ABSTRACT

A computer convergence system includes a convergence functionality module, a computer, and a display device. The convergence functionality module includes a first input for receiving a first video signal and a second input for receiving a second video signal. The computer is coupled to the convergence functionality module and receives therefrom indications of the first video signal received at the first input port and indications of said second video signal received at the second input port. The computer includes a controller for controlling the mapping of the indications of the first video signal to the primary video viewing surface, and further controls the mapping of the indications of the second video signal to either the second video viewing surface or the data acquisition destination.

33 Claims, 4 Drawing Sheets

OTHER PUBLICATIONS

PC Online/Trends Online, *The Big–Tube PCTV,* Internet article, pp. 1–3 (May 28, 1996).

*Destination Features,* Internet article, pp. 1–5 (Aug. 21, 1996).

*Telefuzion,* Internet article, pp. 1–2 (Mar. 12, 1996).

Mike Snider, USA Today, *High–Tech: Now you can tune your TV to the Internet,* article, pp. 1–2 (Sep. 18, 1996).

Philips Semiconductors, *Phase–Locked Loop,* NE/SE54/ Philips Semiconductors, pp. 1–9 (Aug. 31, 1994).

Philips Semiconductors, *An Overview of the Phase–Locked Loop* (PLL), Application Note/AN177, pp. 1–6 (Dec. 1988).

Philips Semiconductors, *Circuit Description of the NE564,* Application Note/AN179, pp. 1–6 (Dec. 1991).

Philips Semiconductors, *Frequency Synthesis with the NE564,* Application Note/AN180, pp. 1–3 (Dec. 1988).

*Advanced Power Management* (APM), Bios Interface Specification, Revision 1.1, pp. 1–59 (Sep. 1993).

* cited by examiner

COMPUTER CONVERGENCE DEVICE CONTROLLER FOR MANAGING DISPARATE VIDEO SOURCES

CROSS-REFERENCE TO RELATED APPLICATIONS

This application is a divisional of U.S. application Ser. No. 08/834,543, filed Mar. 31, 1997, U.S. Pat. No. 6,229,575 which is incorporated herein in its entirety.

STATEMENTS REGARDING FEDERALLY SPONSORED RESEARCH OR DEVELOPMENT

None

REFERENCE TO A MICROFICHE APPENDIX

None

BACKGROUND OF THE INVENTION

1. Field of the Invention

The present invention relates to computer convergence devices, and more particularly, but not by way of limitation, to a personal computer/television (PC/TV) convergence device controller for managing the selection, arbitration, and utilization of multiple disparate video signals received from multiple video sources.

2. Description of the Related Art

A computer convergence device is a fully functional computer integrated or converged with another consumer electronic device. One such convergence device is a personal computer/television (PC/TV) convergence device, which integrates personal computer with television functionality, providing television viewing (via broadcast, cable Digital Satellite, video cassette recorder (VCR), electronic game device, or other video source) and personal computing functionality. The convergence of personal computer and television functionalities, among other things, permits combined access to television viewing and program information, computer related functionality, and Internet Access.

A PC/TV convergence device may comprise a fully functional computer including fax/modems, CD-ROM players, and media storage such as hard drives and floppy drives. The convergence with television functionalities may include utilizing multiple video inputs to receive a variety of video signals such as from cable systems, VCR, and electronic game machines. The computer is interlaced with a display monitor, often a big screen monitor, with either the interlaced video signal being converted to a scan video graphics adapter (VGA) signal or the computer's scan VGA signal being converted to an National Television Standards Committee (NTSC) interlaced signal. Because the PC/TV convergence device is controlled by the computer's operating system, the PC/TV convergence device can, among other things, simultaneously display PC applications and TV programs on a single monitor. The convergence of personal computer and television functionalities into a single device also permits the utilization of the communications bandwidth, mass storage and graphics of the computer to deliver, store and display small computer applications during a traditional television viewing environment.

In spite of many recent advances in this area, several problems remain. One major problem encountered is the need to effectively and efficiently control the complexity of the various video applications available for the possible video sources. For example, some of the available video sources include composite video sources, RF video sources, S-Video and digital versatile disk (DVD), with many of these having various video configurations and differing control characteristics.

Another problem encountered is the need to be able to arbitrate among the various selectable video sources. For example, if data is being downloaded from one video source, it may be desirable to prevent the interruption of that download to prevent data corruption.

Accordingly, based upon the foregoing, it should be appreciated that there is a need for a computer convergence control system that is capable of effectively and efficiently controlling the selection and application of disparate video signals from various video sources, including being able to arbitrate between the selection and application of the various video sources.

BRIEF SUMMARY OF THE INVENTION

The present invention overcomes the above identified problems as well as other shortcomings and deficiencies of existing technologies by providing a computer convergence system including a convergence functionality module, a computer, and a display device. The convergence functionality module includes a first input for receiving a first video signal and a second input for receiving a second video signal. The computer is coupled to the convergence functionality module and receives therefrom indications of the first video signal received at the first input port and indications of said second video signal received at the second input port. The computer includes a controller for controlling the mapping of the indications of the first video signal to the primary video viewing surface, and further controls and arbitrates the mapping of the indications of the second video signal to either a second video viewing surface or a data acquisition destination.

BRIEF DESCRIPTION OF THE SEVERAL VIEWS OF THE DRAWINGS

A more complete understanding of the present invention may be had by reference to the following Detailed Description and appended claims when taken in conjunction with the accompanying Drawings wherein:

DETAILED DESCRIPTION OF THE INVENTION

Computer 12 is coupled to convergence functionality module 14 that is operable to receive or generate data signals, such as video, audio, and graphic information. For example convergence functionality module 14 may comprise a receiver, decoder or tuner capable of receiving television signals in the form of the National Television Standards Committee (NTSC) or Phase Alternate Line (PAL) forms, from any medium such as from a cable system or from a digital satellite system. Convergence functionality module 14 may also include or consist of various other types of consumer electronic units. For example, convergence functionality module 14 could also include or consist of video gaming units and other direct audio/video sources such as video cassette recorders (VCRs), and video disk player/recorders, including digital versatile disk (DVD) player/recorders.

Computer convergence system 10 may preferably be operated by a user using wireless remote input 18 operating, or example, via radio waves, infra-red waves or acoustic waves. Although good results have been achieved using wireless keyboards and remote controls for remote input 18, it is contemplated that any input device, wireless or hardwired, could be used to operate computer convergence system 10.

Figure 1:
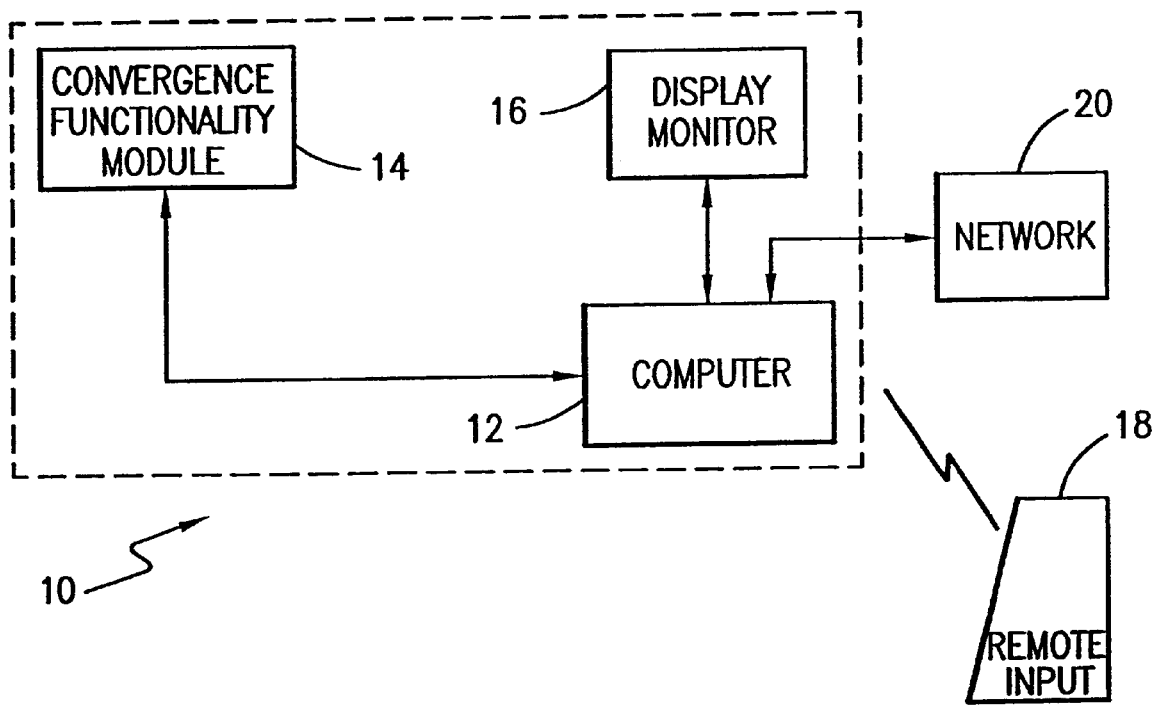
FIG. 1 is a block diagram illustrating a computer convergence system in accordance with the principles and teachings of the present invention.

Still referring to FIG. 1, computer convergence system 10 is configurable to be connected to and communicate with the network 20. It is contemplated that network 20 could be any type of network, including a Local Area Network, a Wide Area Network and the Internet.

In general operation, computer convergence system 10 can be operated in various modes. For example, computer convergence system 10 can be operated in a personal computer mode and a television mode. When is television mode, personal computer 12 processes the audio and video information received or generated by convergence functionality module 14, and outputs the corresponding information on display monitor 16. At least two viewing displays are possible on display monitor 16 when computer convergence system 10 is being operated in television mode, a main display and a secondary display. In a preferred embodiment, the display image of the main display fills the entire screen, with only a portion of the screen dedicated to the viewing of the secondary display, such as with a picture-in picture (PIP) configuration.

When computer convergence system 10 is being operated in computer mode, computer, 12 is utilized to perform computer functions, including executing and running software and interfacing with network 20, with the output of computer 12 being displayed on display monitor 16.

Figure 2:
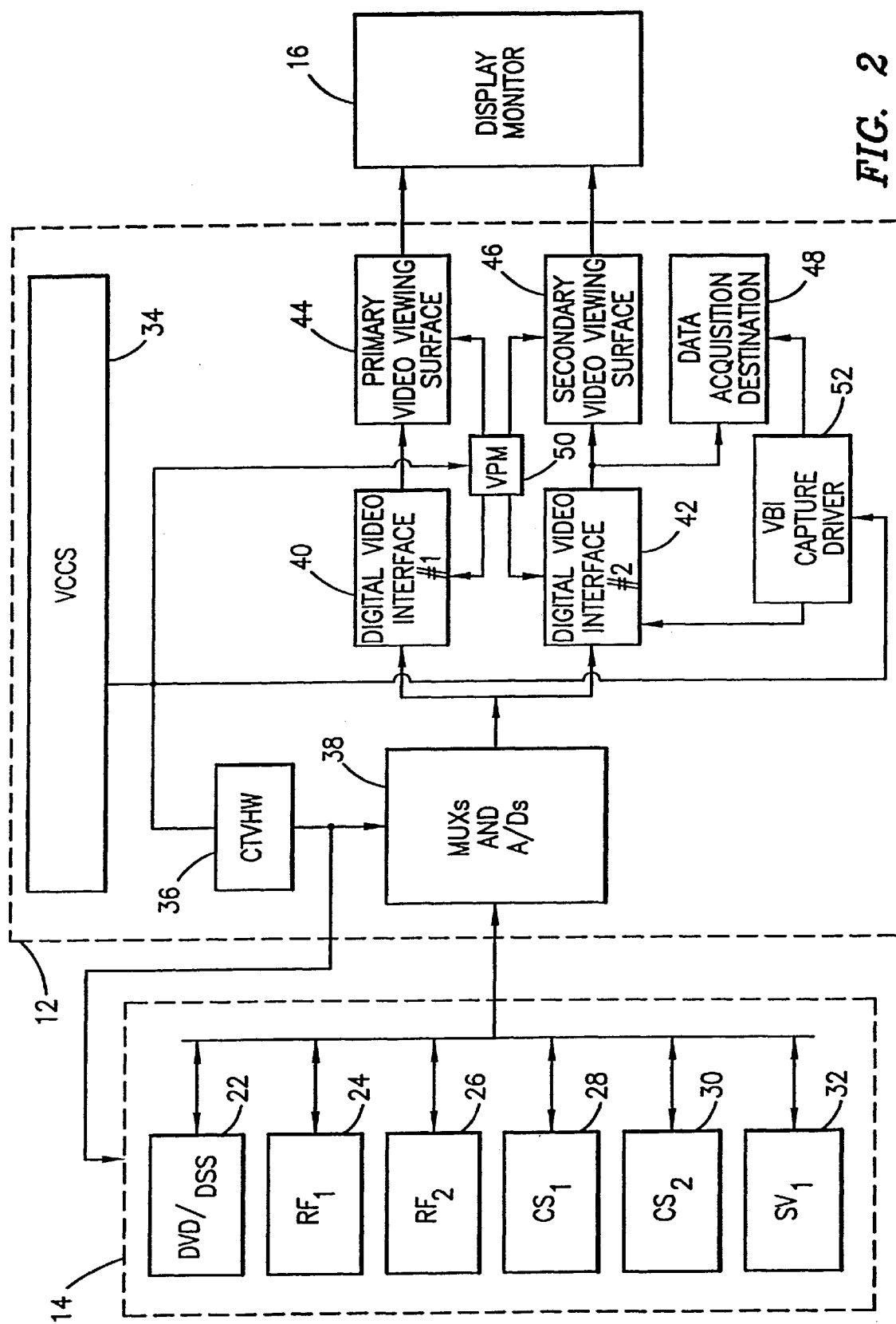
FIG. 2 is a block diagram illustrating, in more detail, an embodiment of the computer convergence system as similarly illustrated in FIG. 1.

Referring now to FIG. 2, there is shown a more detailed block diagram of an exemplary embodiment of computer convergence system 10. As depicted in this exemplary embodiment, convergence functionality module 14 includes multiple video inputs 22, 24, 26, 28, 30 and 32 capable of receiving a variety of video signals from multiple video sources.

For example, inputs 22–32 could be configured as follows: input 22 to receive digital signals such as DVD/DSS video signals; inputs 24 and 26 to receive RF video signals such as from a cable television system; inputs 28 and 30 to receive composite video signals such as from a VCR; and input 32 an S-Video signal such as from a laser disk player. Although convergence functionality module 14 is illustrated in this exemplary embodiment to include the inputs to receive the video signals from various video sources, it is contemplated that convergence functionality module 14 could also include the actual video source such as video players, recorders, tuners, and decoders.

Still referring to FIG. 2, there is illustrated a more detailed block diagram of the video controls utilized by computer 12. The video controls are used to process and select the video signals received from convergence functionality module 14. As depicted, the video controls of computer 12 include a video center control service (VCCS) 34, hardware abstraction interface (CTVHW) 36, various multiplexers and analog-to-digital converters 38, two digital video interfaces 40 and 42, a primary video viewing surface 44, a secondary video viewing surface 46, a data acquisition destination 48, video port manager (VPM) 50 and a vertical blanking interval (VBI) capture driver 52.

VCCS 34 is the central service that provides control for video applications received from convergence functionality module 14. All messages and commands that query or manipulate video applications are preferably processed and/or routed by VCCS 34. Thus the functionality of the VCCS 34 includes: creating and owning the video display windows, processing all video control functions and transport controls (for example, channel up/down); handling bookkeeping of video control settings; managing the switching of the current video source; managing the external sources; initializing and configuring new external devices; and arbitrating application use.

VCCS 34 utilizes CTVHW 36 to control the selection of the video sources with multiplexers 38, and also utilizes CTVHW 36 to control the configuration and modifications of the video source video signals as well and controls the changing of the channels. The analog-to-digital converters 38 are used to convert analog video signal to digital signals. VPM 50, also controlled by VDDS 34, controls the mapping of the video signal received from digital video interface 40 to the primary video viewing surface 44, and similarly controls the mapping of the video signal received from digital video interface 42 to the secondary video viewing surface 46.

Still referring to FIG. 2, VCCS 34 further controls VBI capture driver 52. VBI capture driver 52 controls the mapping of the video signal received from digital video interface 42 to data acquisition destination 48, where, for example, the VBI information will be downloaded. VBI includes various types of data, for example, program listing time and content, and subscriber control codes.

As described hereinabove, in this embodiment display monitor 16 can display the video image information received from primary video viewing surface 44 on the main display, and can display the video image information received form secondary video viewing surface 46 on the secondary display, such as a PIP. When a single first video input is selected images indicative of the video signal will be displayed on main display of display monitor 16. If a second video source is selected to be displayed simultaneously with the images of the first video source, the images corresponding to the second video source will be displayed on the secondary display, such as in a PIP format. It is contemplated that other display formats for simultaneously displaying the main display and the secondary display could also be utilized.

Referring now to FIGS. 1 and 2, a more detailed description of the operation of the present invention will now be given. As described hereinabove, in one exemplary embodiment, computer convergence system 10 is operable in two modes, a computer mode and a television mode. Upon initialization of computer convergence system 10 in television mode, VCCS 34, via VMP 50, will request access to digital video interface 40 and select the primary video viewing surface 44, and via MUX 38, will select an RF video source (i.e. a television tuner) such as input 24. As can be appreciated, the user has the option to change the selection of the video source for digital video interface 40.

If access to the secondary video viewing surface 46, such as a PIP, is requested, VCCS 34 will check on the availability of digital video interface 42 and will check to see if one of the tuners (RFI or RF2) is being utilized by primary video viewing surface 44. If the determination is made that digital video interface 42 is available, and that one of the tuners is being utilized by primary video viewing surface 44, VCCS, via VPM 50, will select secondary video viewing surface 46, and via CTVHW controlling multiplexer 38, will select the available turner. Digital video interface 42 and the turner selected for secondary video viewing surface 46 will then be locked-out to additional user requests, until the user either selects a different video source or turns off the PIP.

If the determination is made that primary video viewing surface 44 is not utilizing one of the television tuners, VCCS 34, via CTVHW 36 controlling multiplexer 38, will select the last chosen video source for secondary video viewing surface 46. Digital video interface 42 will then be locked-out to additional user requests, until the user turns off the PIP.

Similarly, if access to the data acquisition destination 48, such as a VBI download, is requested, VCCS 34 will check on the availability of digital video interface 42. If the determination is made that digital video interface 42 is available, VCCS, via VBI capture driver 52, will select data acquisition destination 48, and via CTVHW controlling multiplexer 38, will select the available turner. Digital video interface 42 and the tuner selected for secondary video viewing surface 46 will then be locked-out to additional user requests, until data acquisition is complete or until the user turns cancels the request for data acquisition destination 48.

As can be appreciated with this exemplary embodiment, as user is able to potentially select the same video source to be displayed both the main and secondary displays of display monitor 16 from signals received from the primary video viewing surface 44 and the secondary video viewing surface 46. However, it is contemplated, that VCCS 43 could also control the selections of the video sources such as to prevent duplication of the video sources at the primary video viewing surface 44 and secondary video viewing surface 46.

To prevent problems arising when a user requests the performance of a function utilizing digital interface 42 when it is unavailable, VCCS 34 will also performs the arbitration among any selected conflicting requests for the concurrent selection of the digital video interface 42.

Figure 3:
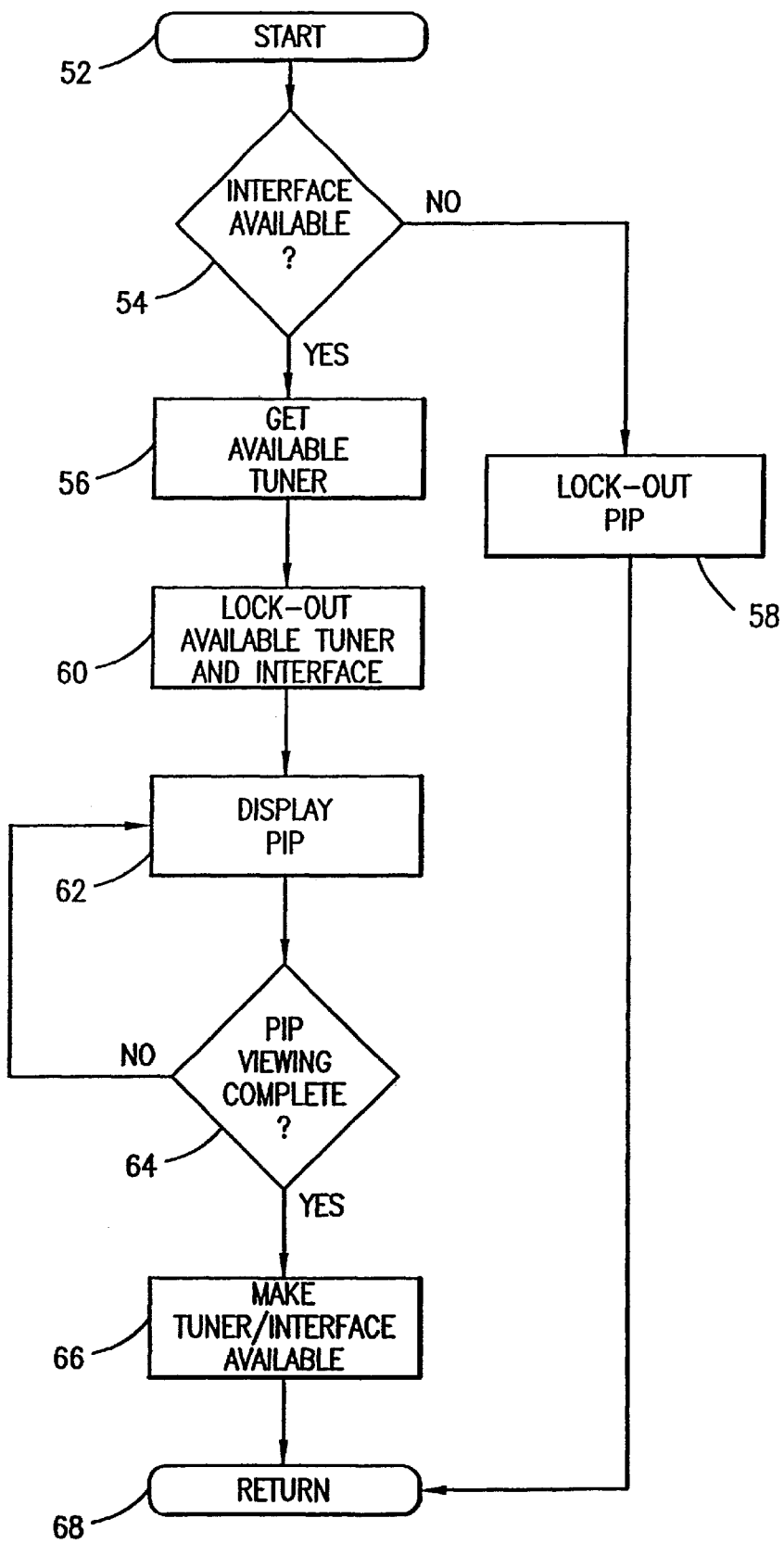
FIG. 3 is a block flow diagram illustrating a preferred embodiment of an arbitration method in accordance with the principles and teachings of the present invention.
Figure 4:
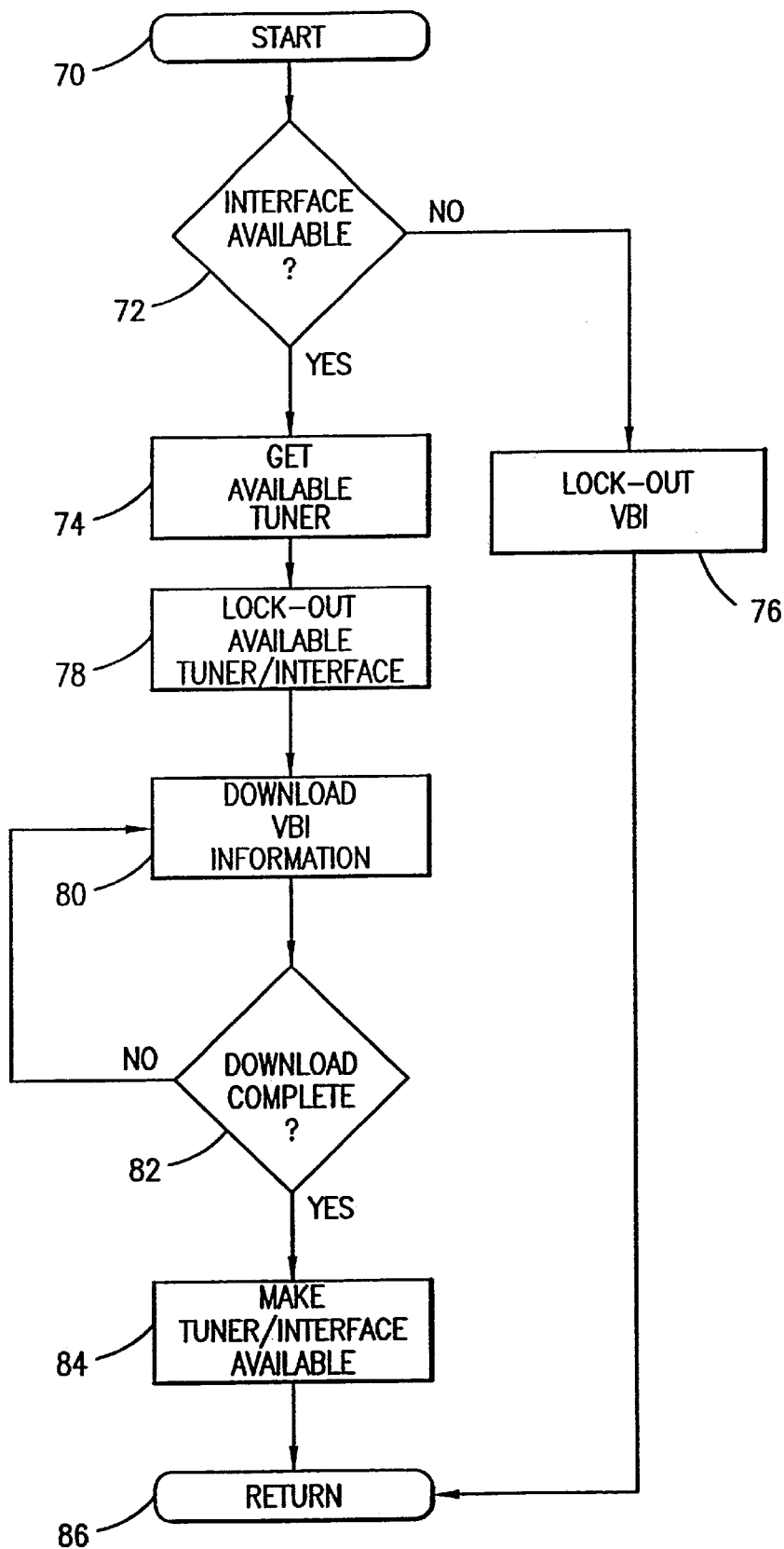
FIG. 4 is a block flow diagram illustrating a preferred embodiment of a second arbitration method in accordance with the principles and teachings of the present invention.

Referring now to FIGS. 3 and 4, there are illustrated flow diagrams of two preferred arbitration methods performed by VCCS 34. In particular, FIG. 3 illustrates a flow diagram of the arbitration performed when a user requests access to secondary video viewing surface 46 and for a PIP. As depicted by blocks 52 and 54, VCCS 34 will check the availability of digital video interface 42. If it is determined that digital video interface 42 is not available, the 'No' path is followed and as indicated by block 58, the PIP request is not performed and the PIP is locked out. An example of when digital video interface 42 may be unavailable, would be when a user is utilizing digital video interface 42 for data acquisition destination 48.

If it is determined that digital video interface 42 is available, the yes path is followed to block 56. As depicted by block 56, the available tuner is then selected. Then as indicated by block 60, the tuner and the digital video interface 42 are locked out to prevent additional user requests. Then, as indicated by block 62, the PIP image is displayed on secondary surface 50. This will continue until the user turns off the secondary surface 50 or chooses another video source, other than $RF_2$, as indicated by decision block 64. If the PIP viewing with $RF_2$, is complete, the 'Yes' path is followed to block 66, where the tuner and digital video interface 42 are then made available for additional user requests.

Referring now to FIG. 4, there is illustrated a flow diagram of the arbitration performed when a user requests access to data acquisition destination 48 such as for a VBI download. As depicted by blocks 70 and 72, VCCS 34 will check the availability of digital video interface 42. If it is determined that digital video interface 42 is not available, the 'No' path is followed and as indicated by block 76, access to data acquisition destination 48 is not granted and VBI is locked out. An example of when digital video interface 42 may be unavailable, would be when a user is utilizing digital video interface 42 for secondary video viewing surface 46, such as a PIP display.

If it is determined that digital video interface 42 is available, the yes path is followed to block 74. As depicted by block 74, the available tuner is then selected. Then as indicated by block 78, the tuner and the digital video interface 42 are locked out to prevent additional user requests. Then, as indicated by block 80, the VBI information is downloaded for the video signal. As depicted by decision block 82, the downloading will continue until all of the information has been obtained or until the user cancels the function. When VBI downloading has been completed, the 'Yes' path is followed to block 84, where the tuner and digital video interface 42 are then made available for additional user requests.

Based upon the foregoing, it should be appreciated that the computer convergence system 10 provided in accordance with the principles of the present invention includes a convergence functionality module, a computer, and a display device. The convergence functionality module includes a first input for receiving a first video signal and a second input for receiving a second video signal. The computer is coupled to the convergence functionality module and receives therefrom indications of the first video signal received at the first input port and indications of said second video signal received at the second input port. The computer includes controller for controlling the mapping of the indications of the first video signal to a primary video viewing surface, and further controls the mapping of the indications of these second video signal to either the second video viewing surface or the data acquisition destination.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

What is claimed is:

1. A method of arbitrating access to a viewing surface responsive to a user request, the viewing surface mapped by an interface in a computer convergence system having a plurality of disparate inputs, each of the plurality of disparate inputs for receiving a corresponding signal, the method comprising the steps of:

determining if the interface is available;
if the interface is unavailable, refusing the user request; and
if the interface is available, accessing the viewing surface, comprising the steps of:
    selecting a selected input from the plurality of disparate inputs;
    displaying the corresponding signal of the selected input on the viewing surface mapped by the interface;
    making the selected input unavailable for additional user requests; and
    making the interface unavailable for additional user requests.

2. The method of claim 1, the step of accessing the viewing surface further comprising the steps of:
    making the interface available for additional user requests responsive to a user action; and
    making the selected input available for additional user requests responsive to the user action.

3. A method of arbitrating access to a data acquisition destination responsive to a user request, the data acquisition destination mapped by an interface in a computer convergence system having a plurality of disparate inputs, the method comprising the steps of:
    determining if the interface is available;
    if the interface is unavailable, refusing the user request; and
    if the interface is available, accessing the data acquisition destination, comprising the steps of:
        selecting a selected input from the plurality of disparate inputs;
        performing a data transfer between the selected input and the data acquisition destination mapped by the interface;
        making the. interface unavailable for additional user requests; and
        making the selected input unavailable for additional user requests.

4. The method of claim 3, the step of accessing the interface further comprising:
    making the interface available for additional user requests responsive to a termination event; and
    making the selected input available for additional user requests responsive to the termination event.

5. The method of claim 3, the termination event comprising:
    completion of the data transfer.

6. The method of claim 3, the termination event comprising:
    a user cancellation request.

7. An arbitrator for controlling access to a viewing surface mapped by an interface in a computer convergence system having a plurality of disparate inputs, each of the plurality of disparate inputs for receiving a corresponding signal, comprising:
    means for receiving a user request to access the viewing surface;
    means for determining if the interface is available;
    means for refusing the user request if the interface is unavailable; and
    means for granting the user request if the interface is available, comprising:
        means for selecting a selected input from one of the plurality of disparate inputs;
        means for accessing the viewing surface;
        means for making the interface unavailable; and
        means for making the selected input unavailable.

8. The arbitrator of claim 7, the means for accessing the destination comprising:
    means for displaying the corresponding signal of the selected input on the viewing surface.

9. The arbitrator of claim 7, the means for granting the user request further comprising:
    means for making the interface available responsive to a termination event; and
    means for making the selected input available responsive to the termination event.

10. The arbitrator of claim 9, the termination event comprising:
    a user action.

11. An arbitrator for controlling access to a data acquisition destination mapped by an interface in a computer convergence system having a plurality of disparate inputs, each of the plurality of disparate inputs for receiving a corresponding signal, comprising:
    means for receiving a user request to access the data acquisition destination;
    means for determining if the interface is available;
    means for refusing the user request if the interface is unavailable; and
    means for granting the user request if the interface is available, comprising:
        means for selecting a selected input from one of the plurality of disparate inputs;
        means for accessing the data acquisition destination;
        means for making the interface unavailable; and
        means for making the selected input unavailable.

12. The arbitrator of claim 11, the means for accessing the data acquisition destination comprising:
    means for performing a data transfer of data in the corresponding signal of the selected input between the selected input and the data acquisition destination.

13. The arbitrator of claim 11, the means for granting the user request further comprising:
    means for making the interface available responsive to a termination event; and
    means for making the selected input available responsive to the termination event.

14. The arbitrator of claim 13, the termination event comprising:
    a user cancellation action.

15. The arbitrator of claim 10, the termination event comprising:
    completion of the data transfer.

16. An arbitrator for controlling access to a viewing surface mapped by an interface in a computer convergence system having a plurality of disparate inputs, each of the plurality of disparate inputs for receiving a corresponding signal, logic within the arbitrator, when executed, performing the steps of:
    receiving a user request to access the viewing surface;
    determining if the interface is available;
    refusing the user request if the interface is unavailable; and
    granting the user request if the interface is available, comprising the steps of:
        selecting a selected input from one of the plurality of disparate inputs;

accessing the viewing surface;
making the interface unavailable; and
making the selected input unavailable.

17. The arbitrator of claim 16, the step of accessing the viewing surface comprising:
displaying the corresponding signal of the selected input on the viewing surface.

18. The arbitrator of claim 16, the step of granting the user request further comprising the steps of:
making the interface available responsive to a termination event; and
making the selected input available responsive to the termination event.

19. The arbitrator of claim 18, the termination event comprising:
a user action.

20. An arbitrator for controlling access to a data acquisition destination mapped by an interface in a computer convergence system having a plurality of disparate inputs, each of the plurality of disparate inputs for receiving a corresponding signal, logic within the arbitrator, when executed, performing the steps of:
receiving a user request to access the data acquisition destination;
determining if the interface is available;
refusing the user request if the interface is unavailable; and
granting the user request if the interface is available, comprising the steps of:
selecting a selected input from one of the plurality of disparate inputs;
accessing the data acquisition destination;
making the interface unavailable; and
making the selected input unavailable.

21. The arbitrator of claim 20, the step of accessing the data acquisition destination comprising:
performing a data transfer of data in the corresponding signal of the selected input between the selected input and the data acquisition destination.

22. The arbitrator of claim 20, the step of granting the user request further comprising the steps of:
making the interface available responsive to a termination event; and
making the selected input available responsive to the termination event.

23. The arbitrator of claim 22 the termination event comprising:
a user cancellation action.

24. The arbitrator of claim 22, the termination event comprising:
completion of the data transfer.

25. A computer convergence system having a plurality of inputs, each of the plurality of inputs having a corresponding signal, and a viewing surface mapped by an interface, the computer convergence system comprising:
a processor; and
an arbitrator coupled to the processor and the plurality of inputs and the interface, the arbitrator adapted to receive a user request to connect a selected input of the plurality of inputs to the viewing surface, logic within the arbitrator, when executed, performing the steps of:
receiving the user request;
determining if the interface is available;
refusing the user request if the interface is unavailable; and
granting the user request if the interface is available, comprising the steps of:
connecting the selected input to the viewing surface via the interface;
making the interface unavailable; and
making the selected input unavailable.

26. The computer convergence system of claim 25, the step of connecting the selected input to the viewing surface comprising:
displaying the corresponding signal of the selected input on the viewing surface.

27. The computer convergence system of claim 25, the step of granting the user request further comprising:
making the interface available responsive to a termination event; and
making the selected input available responsive to the termination event.

28. The computer convergence system of claim 27, the termination event comprising:
a user action.

29. A computer convergence system having a plurality of inputs, each of the plurality of inputs having a corresponding signal, and a data acquisition destination mapped by an interface, the computer convergence system comprising:
a processor; and
an arbitrator coupled to the processor and the plurality of inputs and the interface, the arbitrator adapted to receive a user request to connect a selected input of the plurality. of inputs to the data acquisition destination, logic within the arbitrator, when executed, performing the steps of:
receiving the user request;
determining if the interface is available;
refusing the user request if the interface is unavailable; and
granting the user request if the interface is available, comprising the steps of:
connecting the selected input to the data acquisition destination via the interface;
making the interface unavailable; and
making the selected input unavailable.

30. The computer convergence system of claim 29, the step of connecting the selected input to the destination comprising:
a logic block for performing a data transfer of data in the corresponding signal of the selected input between the selected input and the data acquisition destination.

31. The computer convergence system of claim 29, the logic block for granting the user request further comprising:
a logic block for making the interface available responsive to a termination event; and
a logic block for making the selected input available responsive to the termination event.

32. The computer convergence system of claim 31, the termination event comprising:
a user cancellation action.

33. The computer convergence system of claim 31, the termination event comprising:
completion of the data transfer.

* * * * *

UNITED STATES PATENT AND TRADEMARK OFFICE
CERTIFICATE OF CORRECTION

PATENT NO. : 6,441,861 B2
DATED : August 27, 2002
INVENTOR(S) : Vaughan et al.

It is certified that error appears in the above-identified patent and that said Letters Patent is hereby corrected as shown below:

Column 2,
Line 61, after DETAILED DESCRIPTION OF THE INVENTION, insert the following:
-- With reference now to the figures wherein like or similar elements are designated with identical reference numerals, there are depicted block diagrams illustrating the present invention. The purpose of these block diagrams is to illustrate the features of the invention and the basic principles of operation of an embodiment thereof.

Referring now to Fig. 1, there is shown a block diagram illustrating a computer convergence system 10. Computer convergence system 10 includes a computer 12, a convergence functionality module 14, a display monitor 16 and a remote input 18.

Computer 12 may preferably be a personal computer, and although not shown, includes a processor, memory, data retrieval and storage media and communication data ports. Display monitor 16 is operable to display video images corresponding to video signals received from computer 12 and may further include an audio output system for playing audio signals also received from computer 12. --.

Column 3,
Line 51, the words "For example" should not start a new paragraph but be part of the preceding paragraph.

Column 10,
Line 33, delete "plurality." and insert -- plurality --.

Signed and Sealed this

Eighteenth Day of October, 2005

JON W. DUDAS
*Director of the United States Patent and Trademark Office*